United States Patent
Kammer

(10) Patent No.: US 10,371,123 B2
(45) Date of Patent: Aug. 6, 2019

(54) METHODS AND SYSTEMS FOR DETECTING WIND TURBINE ROTOR BLADE DAMAGE

(71) Applicant: General Electric Company, Schenectady, NY (US)

(72) Inventor: Leonardo Cesar Kammer, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 966 days.

(21) Appl. No.: 13/970,181

(22) Filed: Aug. 19, 2013

(65) Prior Publication Data
US 2015/0050143 A1 Feb. 19, 2015

(51) Int. Cl.
*F03D 17/00* (2016.01)

(52) U.S. Cl.
CPC .......... *F03D 17/00* (2016.05); *F05B 2260/80* (2013.01)

(58) Field of Classification Search
CPC .... F03D 11/0091; F03D 11/00; Y02E 10/722; F05B 2260/80
See application file for complete search history.

(56) References Cited

U.S. PATENT DOCUMENTS

| | | |
|---|---|---|
| 2002/0105189 A1 | 8/2002 | Mikhail et al. |
| 2009/0295159 A1 | 12/2009 | Johnson et al. |
| 2010/0098540 A1 | 4/2010 | Fric et al. |
| 2010/0209243 A1* | 8/2010 | Birkemose ............ F03D 7/0296 416/1 |
| 2011/0084485 A1 | 4/2011 | Miranda et al. |
| 2011/0135442 A1 | 6/2011 | Kerber et al. |
| 2012/0010852 A1 | 1/2012 | Winkelmann et al. |
| 2012/0024053 A1 | 2/2012 | Cheng |
| 2013/0045098 A1 | 2/2013 | Taylor |
| 2013/0325373 A1* | 12/2013 | Qiao .................. G01R 19/2509 702/58 |

FOREIGN PATENT DOCUMENTS

| | | |
|---|---|---|
| CN | 102322391 A | 1/2012 |
| CN | 202443273 U | 9/2012 |
| DE | 102010009941 A1 | 9/2011 |
| DE | 102011116551 A1 | 4/2013 |

(Continued)

OTHER PUBLICATIONS

Fitzgerald, et al., "Damage detection in wind turbine blades using time-frequency analysis of vibration signals", http://ieeexplore.ieee.org; IEEE Xplore Digital Library, Jul. 18-23, 2010, 2 pages, Barcelona, Spain.

(Continued)

*Primary Examiner* — Mohamed Charioui
*Assistant Examiner* — Jeremy A Delozier
(74) *Attorney, Agent, or Firm* — Dority & Manning, P.A.

(57) ABSTRACT

Methods and systems for detecting rotor blade damage in a wind turbine are provided herein. A monitoring system includes a filter module and a damage determination module. The filter module is configured to determine an amplitude of a 1P frequency component of at least one operating condition of the wind turbine. The damage determination module is configured to compare the determined 1P frequency component amplitude to a threshold 1P frequency component amplitude.

20 Claims, 6 Drawing Sheets

(56) References Cited

FOREIGN PATENT DOCUMENTS

| EP | 2112375 A2 | 10/2009 |
|---|---|---|
| WO | 2009000787 A2 | 12/2008 |
| WO | 2012083962 A2 | 6/2012 |
| WO | 2012066107 A2 | 7/2012 |
| WO | 2013060420 A2 | 5/2013 |

OTHER PUBLICATIONS

Zhigiang Wang, Damage Diagnosis for Wind Turbine Blades Based on the Shifting Distance of Characteristic Frequency, http://ieeexplore.ieee.org; IEEE Xplore Digital Library, Oct. 17-19, 2009, 2 pages, Tianjin, China.

Henriksen, et al., "Fault diagnosis of a Wind Turbine Rotor using a Multi-blade Coordinate Framework", 8th IFAC Symposium on Fault Detection, Supervision and Safety of Technical Processes, Aug. 29-31, 2012, 6 pages, Mexico City, Mexico.

Denmark Office Action issued in connection with corresponding DK Application No. PA201470500 dated Mar. 18, 2015.

* cited by examiner

METHODS AND SYSTEMS FOR DETECTING WIND TURBINE ROTOR BLADE DAMAGE

BACKGROUND

The subject matter described herein relates generally to wind turbines and, more particularly, to methods and systems for detecting wind turbine blade inefficiencies.

Wind turbines are generally located in rural settings suitable to capture wind energy. As wind turbine technology improves, rotor blades continue to increase in size and are designed closer to material limits of known wind turbines. As such, known wind turbines are susceptible to damage from multiple sources, including, but not limited to lightning strikes, icing, and/or fatigue loads caused by fluctuating wind conditions.

At least some known damage detection systems may sense a lightning strike or the presence of ice buildup. However, such detection systems do not monitor whether a rotor blade has been damaged by a damaging event. When a rotor blade is damaged, it operates with a decreased power-capture potential. At least some known wind turbines are configured to reduce a load impact of the imbalanced rotor blade, resulting in reduced power capture and reduced efficiency of the wind turbine.

As a result, at least one known method of inspecting for damage to a rotor blade includes visual inspection of the rotor blade surface by a human maintenance worker for cracks and similar damage. The visual inspection often includes the maintenance worker inspecting the rotor blades through binoculars from afar. Another known method of inspection includes dismantling of the rotor blades from the wind turbine and performing more advanced inspections at an inspection center. Such known methods may be time consuming, inefficient, and ineffective at identifying subsurface damage to a rotor blade.

BRIEF DESCRIPTION

In one aspect, a monitoring system is provided for detecting rotor blade damage in a wind turbine. The monitoring system includes a filter module and a damage determination module. The filter module is configured to determine an amplitude of a 1P frequency component of at least one operating condition of the wind turbine. The damage determination module is configured to compare the determined 1P frequency component amplitude to a threshold 1P frequency component amplitude.

In another aspect, a method of detecting rotor blade damage in a wind turbine is provided. The method includes determining an amplitude of a 1P frequency component of at least one operating condition of the wind turbine using a filter module and comparing the determined 1P frequency component amplitude to a threshold 1P frequency component amplitude.

In yet another aspect, a computer-readable storage device is provided having encoded thereon computer readable instructions that are executable by a processor to perform functions including determining an amplitude of a 1P frequency component of at least one operating condition of the wind turbine and comparing the determined 1P frequency component amplitude to a threshold 1P frequency component amplitude. The instructions further cause the processor to perform functions including determining that there is damage to at least one wind turbine rotor blade when the determined 1P frequency component amplitude is greater than the threshold 1P frequency component amplitude.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Furthermore, references to one "implementation" or one "embodiment" of the subject matter described herein are not intended to be interpreted as excluding the existence of additional implementations that also incorporate the recited features.

The monitoring system described herein provides a cost-effective method for monitoring wind turbine blade performance. The embodiments described herein facilitate monitoring rotor blades for a plurality of wind turbines spread out across relatively large distances while facilitating rapid damage detection and reporting to a central monitoring system. Specifically, the systems and methods described herein determine an amplitude of a 1P frequency component of at least one operating condition of the wind turbine using a filter module and compares the determined 1P frequency component amplitude to a threshold 1P frequency component amplitude. When the measured 1P amplitude exceeds the threshold, the monitoring system determines there is damage to at least one rotor blade of the wind turbine. Accordingly, the monitoring system and the method described herein detect anomalies in oscillations within a wind turbine and alert a central monitoring system of potential blade damage. As such, an operational life and efficiency of one or more wind turbine components may be extended.

Figure 1:
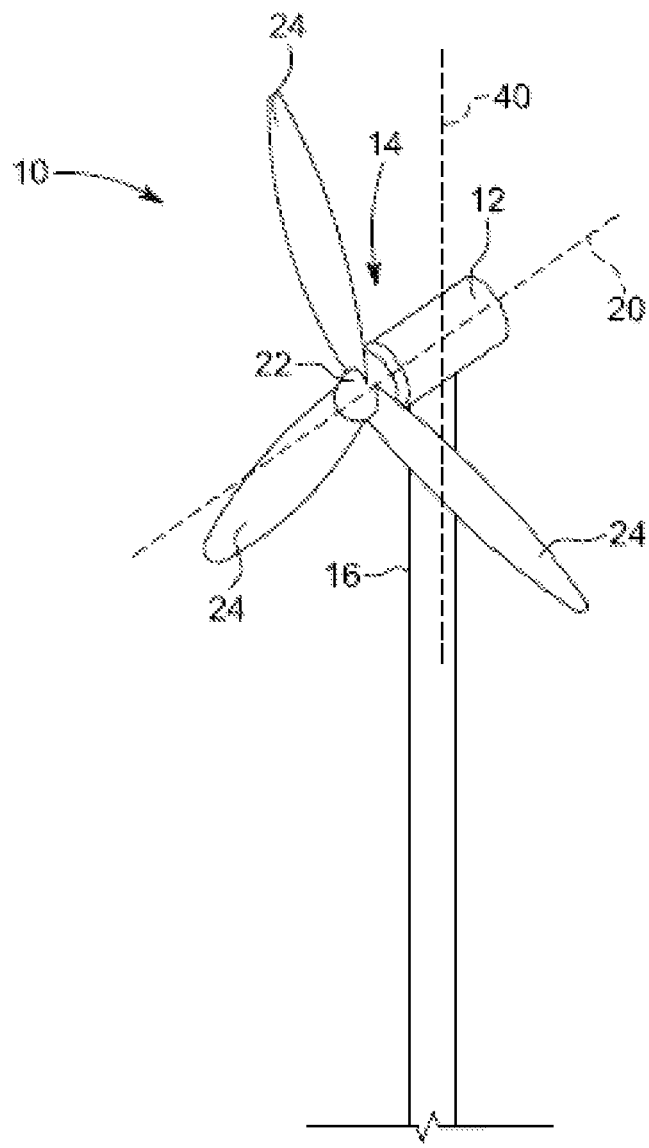
FIG. 1 is a perspective view of an exemplary wind turbine.

FIG. 1 is a perspective view of an exemplary wind turbine 10. Wind turbine 10 described and shown herein is a wind turbine generator for generating electrical power from wind energy. Moreover, wind turbine 10 described and illustrated herein includes a horizontal-axis configuration, however, in some embodiments, wind turbine 10 may include, in addition to or alternatively to the horizontal-axis configuration, a vertical-axis configuration (not shown). Wind turbine 10 may be coupled to an electrical load (not shown in FIG. 1), such as, but not limited to, a power grid, for receiving electrical power therefrom to drive operation of wind turbine 10 and/or its associated components and/or for supplying electrical power generated by wind turbine 10 thereto. Although only one wind turbine 10 is shown in FIGS. 1 and 2, in some embodiments, a plurality of wind turbines 10 may be grouped together, sometimes referred to as a "wind farm."

Wind turbine 10 includes a body or nacelle 12 and a rotor (generally designated by 14) coupled to nacelle 12 for rotation with respect to nacelle 12 about an axis of rotation 20. In the exemplary embodiment, nacelle 12 is mounted on a tower 16. However, in some embodiments, in addition to or alternatively to tower-mounted nacelle 12, nacelle 12 may be positioned adjacent the ground and/or a surface of water. The height of tower 16 may be any suitable height enabling wind turbine 10 to function as described herein. Rotor 14 includes a hub 22 and a plurality of blades 24 (sometimes referred to as "airfoils") extending radially outwardly from hub 22 for converting wind energy into rotational energy. Although rotor 14 is described and illustrated herein as having three blades 24, rotor 14 may have any number of blades 24 that enables operation of wind turbine 10 as described herein. Blades 24 may each have any length that allows wind turbine 10 to function as described herein. For example, in some embodiments, one or more blades 24 are about one-half meter long, while in some embodiments one or more blades 24 are about fifty meters long. Other examples of blade 24 lengths include ten meters or less, about twenty meters, about thirty-seven meters, and about forty meters. Still other examples include blades between about fifty and about one-hundred meters long, and rotor blades greater than one-hundred meters long.

Despite how blades 24 are illustrated in FIG. 1, rotor 14 may have blades 24 of any shape, and may have blades 24 of any type and/or any configuration, whether such shape, type, and/or configuration is described and/or illustrated herein. One example of another type, shape, and/or configuration of blades 24 is a Darrieus wind turbine, sometimes referred to as an "eggbeater" turbine. Yet another example of another type, shape, and/or configuration of blades 24 is a Savonious wind turbine. Moreover, wind turbine 10 may, in some embodiments, be a wind turbine having rotor 14 that generally faces upwind to harness wind energy, and/or may be a wind turbine having rotor 14 that generally faces downwind to harness energy. Of course, in any of the embodiments, rotor 14 may not face exactly upwind and/or downwind, but may face generally at any angle (which may be variable) with respect to a direction of the wind to harness energy therefrom.

Figure 2:
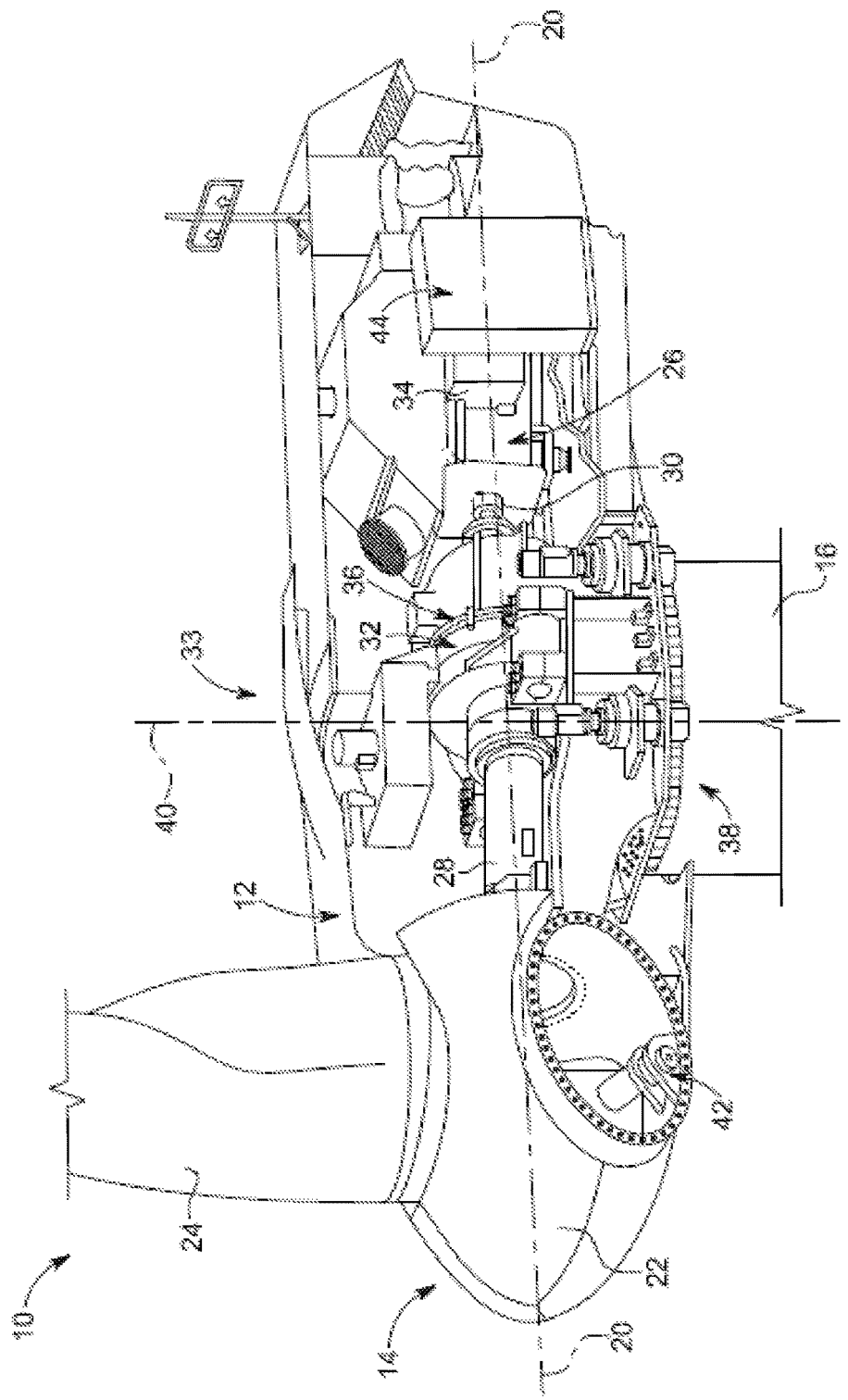
FIG. 2 is a partially cut-away perspective view of a portion of the wind turbine shown in FIG. 1.

FIG. 2 is a partially cut-away perspective view of a portion of wind turbine 10. In the exemplary embodiment, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator, a double-fed induction generator (DFIG, also known as a dual-fed asynchronous generator), a permanent magnet (PM) synchronous generator, an electrically-excited synchronous generator (EESG), and a switched reluctance generator. Generator 26 includes a stator (not shown) and a rotor (not shown) with an air gap defined therebetween. Rotor 14 includes a rotor shaft 28 (also referred to as a "low-speed shaft") coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, the generator rotor has a generator shaft 30 (also referred to as a "high-speed shaft") coupled thereto and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28. Generator 26, rotor shaft 28, generator shaft 30, gearbox 32, and any associated fastening, support, and/or securing device(s) are sometimes referred to as a drive train 33.

The torque of rotor 14 drives the generator rotor to thereby generate variable frequency alternating current (AC) electrical power from rotation of rotor 14. Generator 26 induces an air gap torque between the generator rotor and stator that opposes the torque of rotor 14. A power conversion assembly 34 is coupled to generator 26 for converting the variable frequency AC to a fixed frequency AC for delivery to an electrical load (not shown in FIG. 2), such as, but not limited to a power grid (not shown in FIG. 2), coupled to generator 26. Power conversion assembly 34 may include a single frequency converter or a plurality of frequency converters configured to convert electricity generated by generator 26 to electricity suitable for delivery over the power grid. Power conversion assembly 34 may also be referred to herein as a power converter. Power conversion assembly 34 may be located anywhere within or remote to wind turbine 10. For example, power conversion assembly 34 may be located within a base (not shown) of tower 16.

In some embodiments, wind turbine 10 includes a rotor speed limiter, for example, but not limited to a disk brake 36. Disk brake 36 brakes rotation of rotor 14 to slow rotation of rotor 14, to brake rotor 14 against full wind torque, and/or to reduce the generation of electrical power from electrical generator 26. Furthermore, in some embodiments, wind turbine 10 includes a yaw system 38 for rotating nacelle 12 about an axis of rotation 40 (also referred to as "yaw axis 40") for changing a yaw of rotor 14, and more specifically for changing a direction faced by rotor 14 to adjust an angle between the direction faced by rotor 14 and a direction of wind.

In the exemplary embodiment, wind turbine 10 includes a blade pitch system 42 for controlling and/or changing a pitch angle of blades 24 with respect to a wind direction. Blade pitch system 42 is coupled to hub 22 and blades 24 for changing the pitch angle of blades 24 by rotating blades 24 with respect to hub 22.

Figure 3:
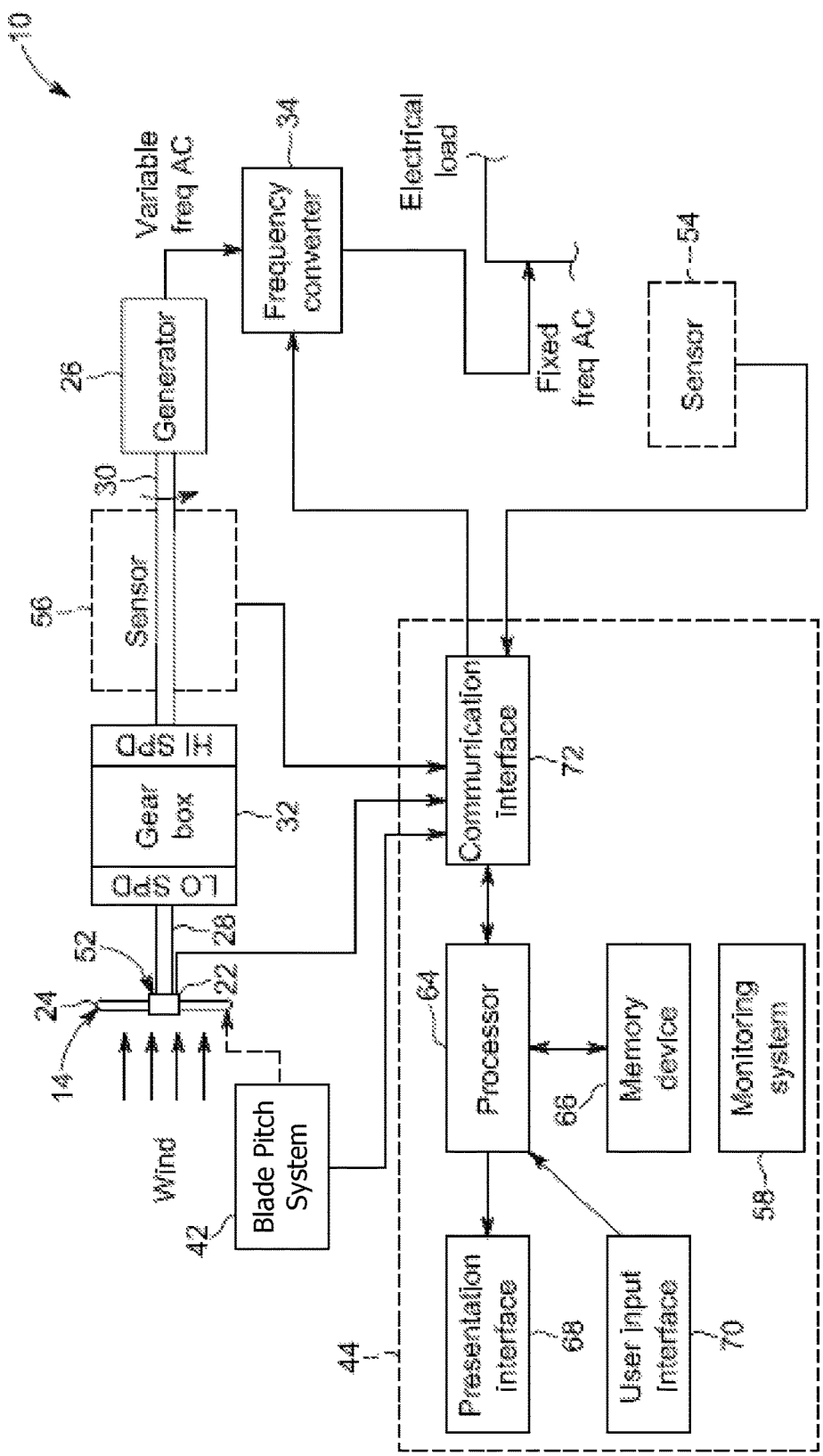
FIG. 3 is a block diagram of an exemplary monitoring system that may be used with the wind turbine shown in FIGS. 1 and 2.

FIG. 3 is a block diagram of an exemplary monitoring system 58 that may be used with wind turbine 10 (shown in FIGS. 1 and 2). In the exemplary embodiment, wind turbine 10 includes one or more system controllers 44 coupled to at least one component of wind turbine 10 for generally controlling operation of wind turbine 10 and/or controlling operation of the components thereof, regardless of whether such components are described and/or shown herein. For example, system controller 44 is coupled to pitch system 42 for generally controlling the pitch of blades 24. In the exemplary embodiment, system controller 44 is mounted within nacelle 12 (shown in FIG. 2). However, additionally or alternatively, one or more system controllers 44 may be remote from nacelle 12 and/or other components of wind turbine 10. System controllers 44 may be used for overall system monitoring and control including, without limitation, pitch and speed regulation, generator shaft and yaw brake application, yaw and pump motor application, and/or fault monitoring. Alternative distributed or centralized control architectures may be used in some embodiments.

In the exemplary embodiment, wind turbine 10 includes a plurality of sensors, for example, sensors 52, 54, and/or 56. Sensors 52, 54, and/or 56 measure a variety of conditions including, without limitation, operating conditions and atmospheric conditions. Each sensor 52, 54, and/or 56 may be an individual sensor or may include a plurality of sensors. Sensors 52, 54, and/or 56 may be any suitable sensor having any suitable location within or remote to wind turbine 10 that enables wind turbine 10 to function as described herein. In some embodiments, sensors 52, 54, and/or 56 are coupled to system controller 44 for transmitting measurements to system controller 44 for processing thereof.

In the exemplary embodiment, wind turbine 10 includes a monitoring system 58 configured to monitor blades 24 for damage. More specifically, in the exemplary embodiment, monitoring system 58 is configured to detect reduction in aerodynamic efficiency of at least one of blades 24. When blades 24 are aerodynamically balanced and operating properly, the rotor speed and the electrical power signals are dominated by 3P content, where P represents a frequency component corresponding to the rotation frequency of the rotor blade system, and the 1P component represents a frequency component corresponding to one period of rotor blade revolution. The 3P component represents a frequency component when three rotor blades are connected to the rotor rotation shaft. The existence of significant 1P component indicates that one of the blades is behaving differently from the other two blades.

System controller 44 includes a processor 64 operatively coupled to a memory device 66 for executing instructions. Processor 64 may include one or more processing units, e.g., in a multi-core configuration. In some embodiments, executable instructions are stored in memory device 66. System controller 44 is configurable to perform one or more operations described herein by programming processor 64. For example, processor 64 may be programmed by encoding an operation as one or more executable instructions and providing the executable instructions in memory device 66. In the exemplary embodiment, memory device 66 is one or more devices that enable storage and retrieval of information such as executable instructions and/or other data. Memory device 66 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 3), and these terms are used interchangeably herein.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Memory device 66 may be configured to store operational measurements including, without limitation, real-time and historical vibration values, and/or any other type data. In some embodiments, processor 64 removes or "purges" data from memory device 66 based on the age of the data. For example, processor 64 may overwrite previously recorded and stored data associated with a subsequent time and/or event. In addition, or alternatively, processor 64 may remove data that exceeds a predetermined time interval. Also, memory device 66 includes, without limitation, sufficient data, algorithms, and commands to facilitate monitoring and control of the components within a monitoring system.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, system controller 44 includes a presentation interface 68 coupled to processor 64. Presentation interface 68 presents information, such as a user interface and/or an alarm, to a user. In one embodiment, presentation interface 68 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 68 includes one or more display devices. In addition, or alternatively, presentation interface 68 includes an audio output device (not shown) (e.g., an audio adapter and/or a speaker) and/or a printer (not shown). In some embodiments, presentation interface 68 presents an alarm associated with the wind turbine being monitored, such as by using a human machine interface (HMI) (not shown in FIG. 3).

In some embodiments, system controller 44 includes a user input interface 70. In the exemplary embodiment, user input interface 70 is coupled to processor 64 and receives input from a user. User input interface 70 may include, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, may function as both a display device of presentation interface 68 and user input interface 70.

A communication interface 72 is coupled to processor 64 and is configured to be coupled in communication with one or more other devices, such as a sensor or another system controller 44, and to perform input and output operations with respect to such devices while performing as an input channel. For example, communication interface 72 may include, without limitation, a wired network adapter, a wireless network adapter, a mobile telecommunications adapter, a serial communication adapter, and/or a parallel communication adapter. Communication interface 72 may receive data from and/or transmit data to one or more remote devices. For example, a communication interface 72 of one system controller 44 may transmit an alarm to the communication interface 72 of another system controller 44. Communication interface 72 may also receive information from sensors 52, 54, and 56 and/or other sensor(s).

Presentation interface 68 and/or communication interface 72 are both capable of providing information suitable for use with the methods described herein (e.g., to a user or another device). Accordingly, presentation interface 68 and communication interface 72 may be referred to as output devices. Similarly, user input interface 70 and communication interface 72 are capable of receiving information suitable for use with the methods described herein and may be referred to as input devices.

Figure 4:
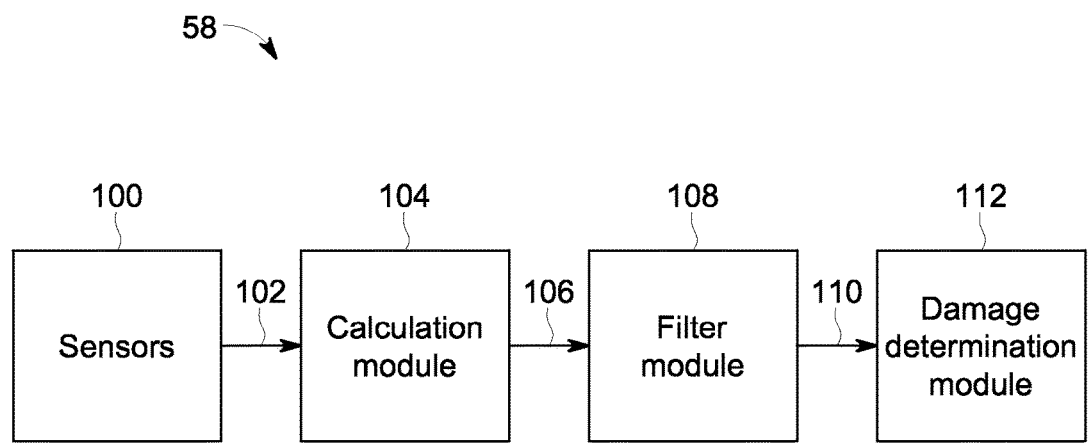
FIG. 4 is a functional block diagram of a portion of the monitoring system shown in FIG. 3.

FIG. 4 is a functional block diagram of a portion of monitoring system 58 (shown in FIG. 3). In the exemplary embodiment, monitoring system 58 is at least partially implemented by system controller 44 (shown in FIG. 3). Alternatively, monitoring system 58 is implemented by any suitable system that enables wind turbine 10 to operate as described herein.

In the exemplary embodiment, monitoring system 58 includes one or more sensors 100 that are operatively coupled to one or more components of wind turbine 10 and/or of monitoring system 58. Sensors 100 measure operating conditions of such components and/or measure other ambient conditions. More specifically, sensors 100 may include, without limitation, one or more transducers configured to measure any suitable operating condition associated with blades 24 (shown in FIG. 1), such as a displacement, yaw, pitch, moment, strain, stress, twist, damage, failure, rotor torque, rotor speed, and/or an anomaly of power supplied to any component of wind turbine 10.

In the exemplary embodiment, each sensor 100 is coupled in electronic signal communication to a calculation module 104 for transmitting at least one suitable operating condition signal 102 representative of one or more measured operating conditions to calculation module 104 for processing. More specifically, in the exemplary embodiment, at least one sensor 100 transmits a signal representative of a measured rotational speed of rotor 14 (hereinafter referred to as a "rotor speed signal ω") and/or a measured rotor position (hereinafter referred to as a "rotor azimuth angle signal θ"). Alternatively or in addition, at least one sensor 100 transmits a signal representative of a measured rotational speed of generator 26, a measured rotational speed of rotor shaft 28, a measured rotational speed of high speed shaft 30, and/or a measured rotational speed of any suitable component of wind turbine 10. Calculation module 104 transmits a processed operating condition signal 106 and/or any other suitable signal to filter module 108.

Filter module 108 performs a filtering operation on processed operating condition signal 106, and/or on any other suitable signal received. More specifically, in the exemplary embodiment, filter module 108 determines an amplitude of a 1P component of the measured operating condition, as described in more detail below. Filter module 108 transmits a 1P component signal 110 to a damage determination module 112.

Damage determination module 112 compares the determined amplitude of the 1P component to a threshold 1P component value to detect blade inefficiencies. If all three rotor blades 24 are aerodynamically balanced and symmetric relative to one another, then the amplitude at the 1P component for generator electrical power and/or rotor speed is substantially zero, i.e., the power and speed do not fluctuate at that particular 1P component. If one of blades 24 is damaged, then energy will be observed when looking at the signal for power or the signal for speed at that particular frequency. Accordingly, when the determined amplitude of the 1P frequency exceeds the threshold 1P frequency, wind turbine 10 is configured to transmit an anomaly alert to a central monitoring system. Anomaly alerts may be stored in memory 66 and may further include, without limitation, a torque deviation, a line fault voltage, a fault current, a line fault frequency, an asymmetric generator current, a cabinet over temperature warning, grid voltage drop, feedback error circuit breaker, or other anomalies in the operation of wind turbine 10. Operating data and/or anomaly alerts stored in memory 66 may be transmitted to the central monitoring system in various suitable manners, such as via a network, and/or a computer-readable media, etc. An anomaly alert indicates to the central monitoring system that the integrity of one of rotor blades 24 may be compromised. More specifically, an anomaly alert indicates that one of rotor blades 24 is producing less power than other turbine blades 24, causing wind turbine 10 to operate at a reduced efficiency.

Figure 5:
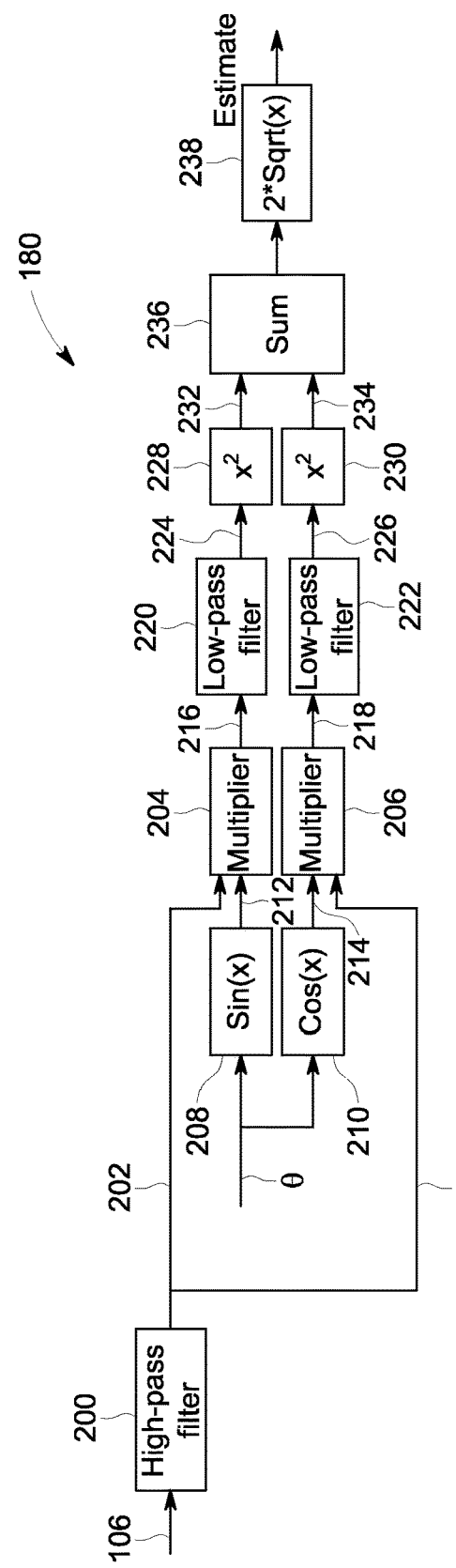
FIG. 5 is a functional block diagram of an exemplary filter module that may be used with the monitoring system shown in FIG. 4.

FIG. 5 is a functional block diagram of an exemplary filter module 108 (shown in FIG. 4) that may be used with the portion of monitoring system 58 (shown in FIG. 4). In the exemplary embodiment, filter module 108 is a phase-locked loop (PLL) filter 180. PLL filter 180 is configured as a plurality of function blocks within a processor, such as processor(s) 64 (shown in FIG. 3). For clarity, PLL filter 180 is illustrated external to system controller 44. However, in alternative embodiments, PLL filter 180 may be configured within processor(s) 64.

In the exemplary embodiment, PLL filter 180 receives operating condition measurement signal 106 for at least one wind turbine operating condition. More specifically, PLL filter 180 receives a measurement for rotor speed and/or generator electrical power. Operating condition measurement signal 106 is inputted into a high-pass filter 200 to reduce the amplitude of signals with frequencies lower than a predetermined cutoff frequency. High-pass filter 200 outputs a filtered measurement signal 202 to a first multiplier 204 and a second multiplier 206.

In the exemplary embodiment, PLL filter 180 also receives rotor position data. More specifically, PLL filter 180 receives azimuth angle signal θ from sensors 100 (shown in FIG. 4). Rotor azimuth angle signal θ is inputted into a sine block 208 and a cosine block 210, which calculate the sine and cosine of the rotor azimuth angle, respectively.

An output signal 212 of sine block 208 is inputted into first multiplier 204 and an output signal 214 of cosine block 210 is inputted into second multiplier 206. First and second multipliers 204 and 206 perform calculations and output a first multiplier output signal 216 and a second multiplier output signal 218, respectively. Each of first and second multiplier output signals 216 and 218 has a mean value of one-half of the amplitude of the 1P oscillation, at orthogonal components of the original oscillation.

First and second multiplier output signals 216 and 218 are inputted into a first low-pass filter 220 and a second low-pass filter 222, respectively. First and second low-pass filters 220 and 222 reduce the amplitude of signals with frequencies higher than the predetermined cutoff frequency. First low-pass filter 220 outputs a first filtered multiplier signal 224 and second low-pass filter 222 outputs a second filtered multiplier signal 226. After low-pass filtering, only the mean values remain in first and second filtered multiplier signals 224 and 226.

First filtered multiplier signal 224 is then inputted into a first square function block 228. Second filtered multiplier signal 226 is inputted into a second square function block 230. An output 232 of first square function block 228 and an output 234 of second square function block 230 are summed in a summing junction 236. A square root function block 238 takes the square root of the sum and multiplies it by two to form an absolute magnitude of the original oscillation at the 1P frequency.

Figure 6:
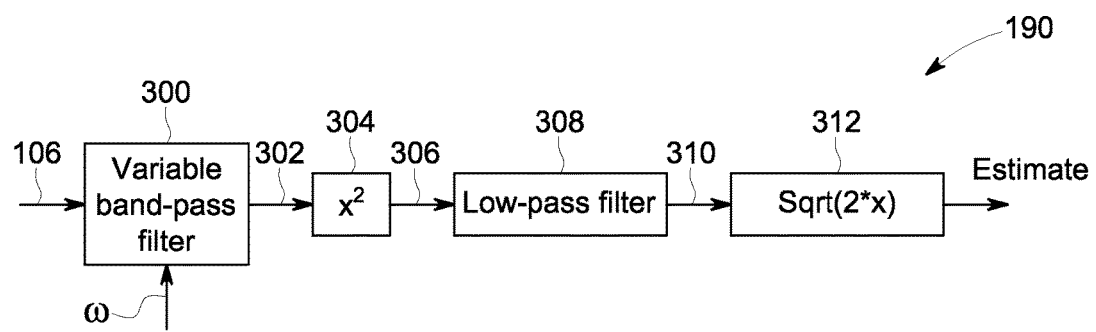
FIG. 6 is a functional block diagram of an alternative exemplary filter module that may be used with the portion of the monitoring system shown in FIG. 4.

FIG. 6 is a functional block diagram of an alternative exemplary filter module 108 (shown in FIG. 4) that may be used with the portion of the monitoring system 58 shown in FIG. 4. In the exemplary embodiment, filter module 108 is a band-pass filter 190. In the exemplary embodiment, band-pass filter 190 is configured as a plurality of function blocks within a processor, such as processor(s) 64 (shown in FIG. 3). For clarity, band-pass filter 190 is illustrated external to system controller 44. However, in alternative embodiments, band-pass filter 190 may be configured within processor(s) 64.

In the exemplary embodiment, band-pass filter 190 receives operating condition measurement signal 106 for at least one wind turbine operating condition. More specifically, in the exemplary embodiment, band-pass filter 190 receives a measurement for rotor speed and/or generator electrical power. Operating condition measurement signal 106 is inputted into a variable band-pass filter 300.

In the exemplary embodiment, band-pass filter 190 also receives rotor speed data. More specifically, band-pass filter 190 receives a rotor speed signal co. Rotor speed signal co is inputted into variable band-pass filter 300.

Variable band-pass filter 300 is configured to pass frequencies between predetermined upper and lower cutoff frequencies and reject frequencies outside of that range. Variable band-pass filter 300 filters the measured operating condition at a narrow range of frequencies near the rotor speed. Variable band-pass filter 300 outputs a filtered measurement signal 302 to a square function block 304.

Square function block 304 mathematically squares filtered measurement signal 302 and outputs a squared measurement signal 306 to a low-pass filter 308. Low-pass filter 308 filters and reduces the amplitude of signals with frequencies higher than the predetermined cutoff frequency and outputs a filtered signal 310. After low-pass filtering, only the mean values remain in filtered signal. Filtered signal 310 is then inputted into a square root function block 312 that multiplies filtered signal 310 by two and calculates a square root of the resulting product to determine amplitude of the 1P component of the measured operating condition.

The above-described embodiments provide a monitoring system for detecting rotor blade damage in a wind turbine. The monitoring system determines amplitude of a 1P frequency component of at least one operating condition of the wind turbine using a filter module and compares the determined 1P frequency component amplitude to a threshold 1P frequency component amplitude. When the measured 1P amplitude exceeds the threshold, the monitoring system determines there is damage to at least one rotor blade of the wind turbine. Accordingly, the monitoring system and the method described herein detect anomalies in oscillations within a wind turbine and alert a central monitoring system of potential blade damage. As such, an operational life and efficiency of one or more wind turbine components may be extended.

A technical effect of the systems, methods, and device described herein includes at least one of: (a) determining amplitude of a 1P frequency component of at least one operating condition of a wind turbine using a filter module; and (b) comparing the determined 1P frequency component amplitude to a threshold 1P frequency component amplitude.

Exemplary embodiments of a wind turbine monitoring system, and a method for detecting rotor blade damage in a wind turbine are described above in detail. The embodiments are not limited to the specific embodiments described herein, but rather, components of the system and/or steps of the method may be utilized independently and separately from other components and/or steps described herein. For example, the monitoring system may also be used in combination with other wind turbines and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine system, comprising:
   a nacelle mounted to a tower;
   a rotor coupled to the nacelle, the rotor including a hub and a plurality of blades extending radially outward from the hub for converting wind energy into rotational energy;
   a first shaft coupled to the hub, the first shaft rotating at the same rotational speed as the rotor;
   a gearbox comprising a low-speed end and a high-speed end, the low speed-end coupled to the first shaft;

a second shaft coupled to the high-speed end of the gearbox, the second shaft rotating at a greater rotational speed than the first shaft;

a generator coupled to the second shaft;

a blade pitch system for controlling a pitch angle of the plurality of blades with respect to a wind direction, the blade pitch system coupled to both the hub and the plurality of blades;

one or more sensors for sensing at least one operating condition of the wind turbine, the one or more sensors coupled to the second shaft between the gearbox and the generator; and a monitoring system for detecting rotor blade damage, said monitoring system comprising:

a calculation module for receiving a signal representative of the at least one operating condition from the one or more sensors;

a filter module for receiving a signal from the calculation module and determining an amplitude of a 1P frequency component of the at least one operating condition of the wind turbine; and a damage determination module for receiving a signal representative of the determined 1P frequency component from the filter module and comparing the determined 1P frequency component amplitude to a threshold 1P frequency component amplitude, wherein the damage determination module determines that there is aerodynamic damage to at least one blade when an amplitude of the determined 1P frequency component is greater than an amplitude of a threshold 1P frequency component.

2. The system in accordance with claim 1, wherein said calculation module is further configured to receive a measurement for at least one of a rotor speed and generator electric power associated with the wind turbine, wherein the one or more sensors measures at least one of displacement, yaw, pitch, moment, strain, stress, twist, damage, failure, rotor torque, rotor speed, rotor position, atmospheric conditions, and an anomaly of power supplied to at least one component of the wind turbine system.

3. The system in accordance with claim 2, wherein said calculation module is further configured to determine amplitude of a 1P frequency component of at least one of a rotor speed and generator electric power associated with the wind turbine, wherein the one or more sensors measures at least one of strain, stress, twist, and an anomaly of power supplied to at least one component of the wind turbine system.

4. The system in accordance with claim 3, wherein the one or more sensors measures at least one strain.

5. The system in accordance with claim 3, wherein the one or more sensors measures at least one twist.

6. The system in accordance with claim 3, wherein the one or more sensors measures at least one anomaly of power supplied to at least one component of the wind turbine system.

7. The system in accordance with claim 1, wherein said filter module comprises a phase-locked loop (PLL) filter.

8. The system in accordance with claim 7, wherein said PLL filter is configured to lock a frequency of the wind turbine to a measurement of rotor position.

9. The system in accordance with claim 8, wherein said PLL filter is further configured to:

receive at least one operating condition signal;

receive a rotor azimuth angle measurement signal;

filter any signal having a frequency greater than a predetermined cutoff frequency; and determine an absolute magnitude of oscillation of the at least one operating condition at the 1P frequency component.

10. The system in accordance with claim 1, wherein said filter module comprises a variable band-pass filter, wherein the blade pitch system further comprises a system controller, and wherein the system controller further comprises at least one application specific integrated circuit (ASIC).

11. The system in accordance with claim 10, wherein said variable band-pass filter is configured to schedule a frequency of the wind turbine to a measurement of rotor speed.

12. The system in accordance with claim 11, wherein said variable band-pass filter is further configured to:

receive the at least one operating condition signal;

receive a rotor speed measurement signal; and filter the at least one operating condition signal to a predetermined range of frequencies related to rotor speed.

13. A method of detecting rotor blade damage in a wind turbine comprising a nacelle mounted to a tower; a rotor coupled to the nacelle, the rotor including a hub and a plurality of blades extending radially outward from the hub for converting wind energy into rotational energy; a blade pitch system for controlling a pitch angle of the plurality of blades with respect to a wind direction; one or more sensors for sensing at least one operating condition of the wind turbine; and a monitoring system for detecting rotor blade damage, said monitoring system comprising calculation module, a filter module, and a damage determination module, said method comprising:

sensing, at the hub, at least one operating condition of the wind turbine using the one or more sensors of the wind turbine;

receiving a signal representative of the at least one operating condition in the calculation module of the monitoring system of the wind turbine;

transmitting a processed operating condition signal to the filter module of the monitoring system of the wind turbine using the calculation module of the monitoring system of the wind turbine;

determining an amplitude of a 1P frequency component of at least one operating condition of the wind turbine using the filter module of the monitoring system of the wind turbine;

transmitting a signal representative of the 1P frequency component to the damage determination module of the monitoring system of the wind turbine; and comparing the determined 1P frequency component amplitude to a threshold 1P frequency component amplitude using the damage determination module of the monitoring system of the wind turbine, wherein the damage determination module determines that there is aerodynamic damage to at least one wind turbine rotor blade when an amplitude of the determined 1P frequency component is greater than an amplitude of a threshold 1P frequency component.

14. The method in accordance with claim 13, further comprising determining an amplitude of a 1P frequency component of at least one of a rotor speed and generator electric power associated with the wind turbine, wherein sensing, at the hub, further comprises measuring at least one of displacement, yaw, pitch, moment, strain, stress, twist, damage, failure, rotor torque, rotor speed, rotor position, atmospheric conditions, and an anomaly of power supplied to at least one component of the wind turbine system.

15. The method in accordance with claim 13, wherein the filter module includes a phase-locked loop (PLL), said method further comprising:
receiving at least one operating condition signal;
receiving a rotor azimuth angle measurement signal;
filtering any signal having a frequency greater than a predetermined cutoff frequency; and
determining an absolute magnitude of oscillation of the at least one operating condition at the 1P frequency component,
wherein sensing, at the hub, further comprises measuring at least one of displacement, yaw, pitch, rotor torque, rotor speed, and rotor position.

16. The method in accordance with claim 13, wherein the filter module includes a variable band-pass filter, said method further comprising:
receiving the at least one operating condition signal;
receiving a rotor speed measurement signal; and
filtering the at least one operating condition signal to a predetermined range of frequencies related to rotor speed.

17. A non-transitory computer-readable media having encoded thereon computer readable instructions that are executable by a processor of a wind turbine, said wind turbine comprising a nacelle mounted to a tower; a rotor coupled to the nacelle, the rotor including a hub and a plurality of blades extending radially outward from the hub for converting wind energy into rotational energy; a blade pitch system for controlling a pitch angle of the plurality of blades with respect to a wind direction; one or more sensors for sensing at least one operating condition of the wind turbine; and a monitoring system for detecting rotor blade damage, said monitoring system comprising calculation module, a filter module, and a damage determination module, said processor programmed to perform functions comprising:
sensing, at a remote location, at least one operating condition of the wind turbine using the one or more sensors of the wind turbine;
transmitting a signal representative of the at least one operating condition to the calculation module of the monitoring system of the wind turbine;
transmitting a processed operating condition signal to the filter module using the calculation module of the monitoring system of the wind turbine;
determining an amplitude of a 1P frequency component of the at least one operating condition of the wind turbine using the filter module of the monitoring system of the wind turbine;
transmitting a signal representative of the 1P frequency component to the damage determination module of the monitoring system of the wind turbine; and
comparing the determined 1P frequency component amplitude to a threshold 1P frequency component amplitude using the damage determination module of the monitoring system of the wind turbine, wherein the damage determination module determines that there is aerodynamic damage to at least one wind turbine rotor blade when an amplitude of the determined 1P frequency component is greater than an amplitude of a threshold 1P frequency component.

18. A non-transitory computer-readable media in accordance with claim 17, wherein the instructions are executable by the processor to perform functions comprising transmitting an anomaly alert signal when damage to at least one wind turbine rotor blade is determined,
wherein sensing, at a remote location, further comprises measuring at least one of displacement, yaw, pitch, moment, strain, stress, twist, damage, failure, rotor torque, rotor speed, rotor position, atmospheric conditions, and an anomaly of power supplied to at least one component of the wind turbine system.

19. A non-transitory computer-readable media in accordance with claim 17, wherein the instructions are executable by the processor to perform functions comprising determining amplitude of a 1P frequency component of at least one of a rotor speed and generator electric power associated with the wind turbine,
wherein sensing, at a remote location, further comprises measuring at least one atmospheric condition, and
wherein the anomaly alert comprises at least one of a torque deviation, a line fault voltage, a fault current, a line fault frequency, an asymmetric generator current, a cabinet over temperature warning, grid voltage drop, and a feedback error circuit breaker.

20. A non-transitory computer-readable media in accordance with claim 18, wherein the anomaly alert is transmitted via a human machine interface (HMI).

* * * * *